United States Patent
Mattstedt et al.

(10) Patent No.: US 6,564,542 B2
(45) Date of Patent: May 20, 2003

(54) IGNITION SYSTEM FOR COMBUSTION CHAMBERS OF ROCKET ENGINES

(75) Inventors: Thomas Mattstedt, Munich (DE);
Christian Hensel, Munich (DE);
Maurits de Wilde, Wageningen (NL);
Edwin Vermeulen, Amsterdam (NL)

(73) Assignees: Astrium GmbH, Munich (DE); Stork Product Engineering B.V., Amsterdam (NL)

(*) Notice: Subject to any disclaimer, the term of this patent is extended or adjusted under 35 U.S.C. 154(b) by 0 days.

(21) Appl. No.: 09/904,573

(22) Filed: Jul. 16, 2001

(65) Prior Publication Data

US 2002/0026788 A1 Mar. 7, 2002

(30) Foreign Application Priority Data

Jul. 15, 2000 (EP) .............................. 00115375

(51) Int. Cl.$^7$ .................................... F02K 9/95
(52) U.S. Cl. ........................ 60/257; 60/39.826
(58) Field of Search ..................... 60/39.826, 257, 60/259

(56) References Cited

U.S. PATENT DOCUMENTS

| | | | |
|---|---|---|---|
| 3,098,353 A | 7/1963 | Abild | 60/35.6 |
| 3,943,706 A | 3/1976 | Grafwallner et al. | 60/204 |
| 5,116,000 A | 5/1992 | Girard | 244/135 R |
| 5,531,067 A | 7/1996 | Koppel | 60/259 |

FOREIGN PATENT DOCUMENTS

| | | |
|---|---|---|
| DE | 2 300 983 | 1/1973 |
| EP | 0 953 759 A2 | 4/1999 |
| FR | 1.114.309 | 5/1954 |
| FR | 2 636 095 | 9/1988 |
| FR | 2 671 138 | 12/1990 |
| GB | 1 439 368 | 7/1973 |

*Primary Examiner*—Louis J. Casaregola
(74) *Attorney, Agent, or Firm*—Crowell & Moring LLP

(57) ABSTRACT

An ignition system for combustion chambers of rocket engines has a first fuel tank for a first fuel constituent and a second fuel tank for a second fuel constituent, both of which are separated from the fuel tanks of the rocket engine. Feed pipes (3, 4) for the respective fuel constituent are arranged between the igniter and a fuel tank.

11 Claims, 2 Drawing Sheets

IGNITION SYSTEM FOR COMBUSTION CHAMBERS OF ROCKET ENGINES

BACKGROUND AND SUMMARY OF THE INVENTION

This application claims the priority of European patent document 00115375.8, filed Jul. 15, 2000, the disclosure of which is expressly incorporated by reference herein.

The present invention relates to an ignition system for a combustion chamber of a rocket engine.

Ignition systems of the generic type are known for example, from German Patent Document DE 23 00 983 and can basically be used in all types of rocket engines. They are particularly useful, however, in rocket engines with liquid fuels.

European Patent Document EP 0 953 759 also describes a rocket engine ignition system whose operating condition depends considerably on the operating condition of the rocket engine itself, because the oxidant required for the ignition system is supplied by the rocket engine. For this purpose, complex coordination of the operating conditions is required.

With reference to FIG. 2, German Patent Document DE 23 00 983 describes an ignition system which has a fuel tank for one fuel constituent. By means of feed pipes, a first fuel constituent is introduced into the fuel tank of the second fuel constituent and is mixed there with the latter. Subsequently, controlled by valves, the mixed fuel constituents are fed in a joint feed pipe to an igniter.

It is a disadvantage of this prior art that, as a result of the early mixing of the fuel constituents, a dangerous mixture is created which has to be transported to the igniter along an unnecessarily long path. Also, relatively high expenditures are required for the refueling of the ignition system with the required fuel constituents.

It is therefore an object of the present invention to provide an improved and technically uncomplicated ignition system which ensures higher safety.

This and other objects and advantages are achieved by the ignition system for combustion chambers of rocket engines according to the invention, which has a first fuel tank for a first fuel constituent and a second fuel tank for a second fuel constituent, both of which are separated from the fuel tanks of the rocket engine. Thus, the conditions for the fuel constituents of the ignition system can be adjusted and optimized separately from those of the rocket engine. As a result, an adjustment of the operating conditions of the ignition system is also facilitated because it can take place completely independently of the operating conditions of the rocket engine.

Furthermore, the ignition system comprises an igniter and feed pipes for the respective fuel constituent arranged between the igniter and of the fuel tanks. As a result, it is ensured that mixing of the fuel constituents takes place at the latest possible point in time, specifically only inside the igniter. As a result, a higher operating safety of the system can be ensured.

In this case, the ignition system can, in particular, be designed such that several consecutive ignitions can take place. This can, for example, be implemented by a corresponding design for the control of the ignition system (especially of the switching and control devices provided there, such as valves or the like). As a result, the combustion chamber can be switched off again after a first ignition, and thus a first operation, and can be started again by a new ignition by means of the ignition system. The ignition system according to the invention is particularly suitable for such an application because, depending on the respective application situation, a different number and type of ignitions may become necessary. Because the ignition system can be adjusted independently of the operating conditions of the rocket engine, it is possible to adapt the ignition system to the individual necessities, specifically for multiple ignitions.

As a further feature of the present invention, it is provided that, for regulating the pressure, at least one restrictor is provided in each of the feed pipes. Regulation of pressure in this case therefore does not take place by a pressure control device, such as a control valve with a pertaining electronic control system, as is conceivable per se; rather, much simpler passive elements are used which are therefore also less susceptible to disturbances. Thus, in addition to a constructional simplification, such simpler passive elements contribute to an increased operating safety. The restrictors can either be fixedly installed so that they always generate a certain pressure regulation, or they may have an exchangeable construction, so that an adaption of the pressure regulation can take place to the respective actual situations of the planned operating conditions of the ignition system. The flow-through effect of restrictors is basically known from the field of hydrodynamics, as described, for example in H. Zoebl, J. Kruschik, "Flow through Pipes and Valves", Springer Publishers Wien, N.Y., 1982, Page 72.

Furthermore, it can be provided that the fuel tanks have an exchangeable construction. Thus, on the one hand, a simple refilling of the fuel tanks can take place outside the ignition system, whereby the constructional expenditures of the ignition system are also reduced because refilling feeds are unnecessary. On the other hand, as a result of the appropriate selection of the fuel tanks, a flexible adaptation of the ignition system to the data of the planned operating conditions can take place, for example, by the selection of different fuels or by providing larger or smaller fuel tanks. In particular, this can also result in a suitable adaptation of the ignition system to different types and numbers of multiple ignitions.

In order to open up the flow of the fuel constituents in the feed pipes and optionally prevent this flow again, it is at least one shut-off valve is preferably provided in each feed pipe. These valves can have a very simple design because they need only take up the open and closed conditions; high-expenditure triggering and control, for example for regulating the pressure, is not required.

In particular, the ignition system can be further developed such that each feed pipe is connected with a rinsing and ventilating system. In the case of the ventilation, a quantity of fuel constituents still remaining after the ignition has taken place can be removed from the ignition system and, particularly in the case of an interruption of the starting operation of the carrier system with which the ignition system is interacting, the fuel can be removed in a simple manner from the ignition system. The rinsing capability can be used for rinsing the ignition system with a cleaning gas or basically also with a suitable liquid in order to remove any residue of the fuel constituents from the ignition system and, for example, prevent a formation of ice in the ignition system. Basically, for each of the feed pipes, a separate rinsing and ventilating system can be provided. However, for reasons of simplicity, it is useful to provide a common rinsing and ventilating system.

Furthermore, the feed pipes may have at least one return valve in order to prevent the fuel constituents from flowing back in the direction of the fuel tanks in the feed pipes, particularly after these had already been mixed in the igniter. Such a return flow could otherwise be triggered, for example, by pressure waves in the combustion chamber. As a result, penetration of undesirable substances (particularly of moisture) into the feed pipes and the fuel tanks can be prevented.

For controlling the function of the shut-off valves and for monitoring the operating behavior of the ignition system, it can be provided, in particular, that the feed pipes are connected with devices for determining the pressure and/or the temperature in the feed pipes.

Other objects, advantages and novel features of the present invention will become apparent from the following detailed description of the invention when considered in conjunction with the accompanying drawings.

DETAILED DESCRIPTION OF THE DRAWINGS

Figure 1:
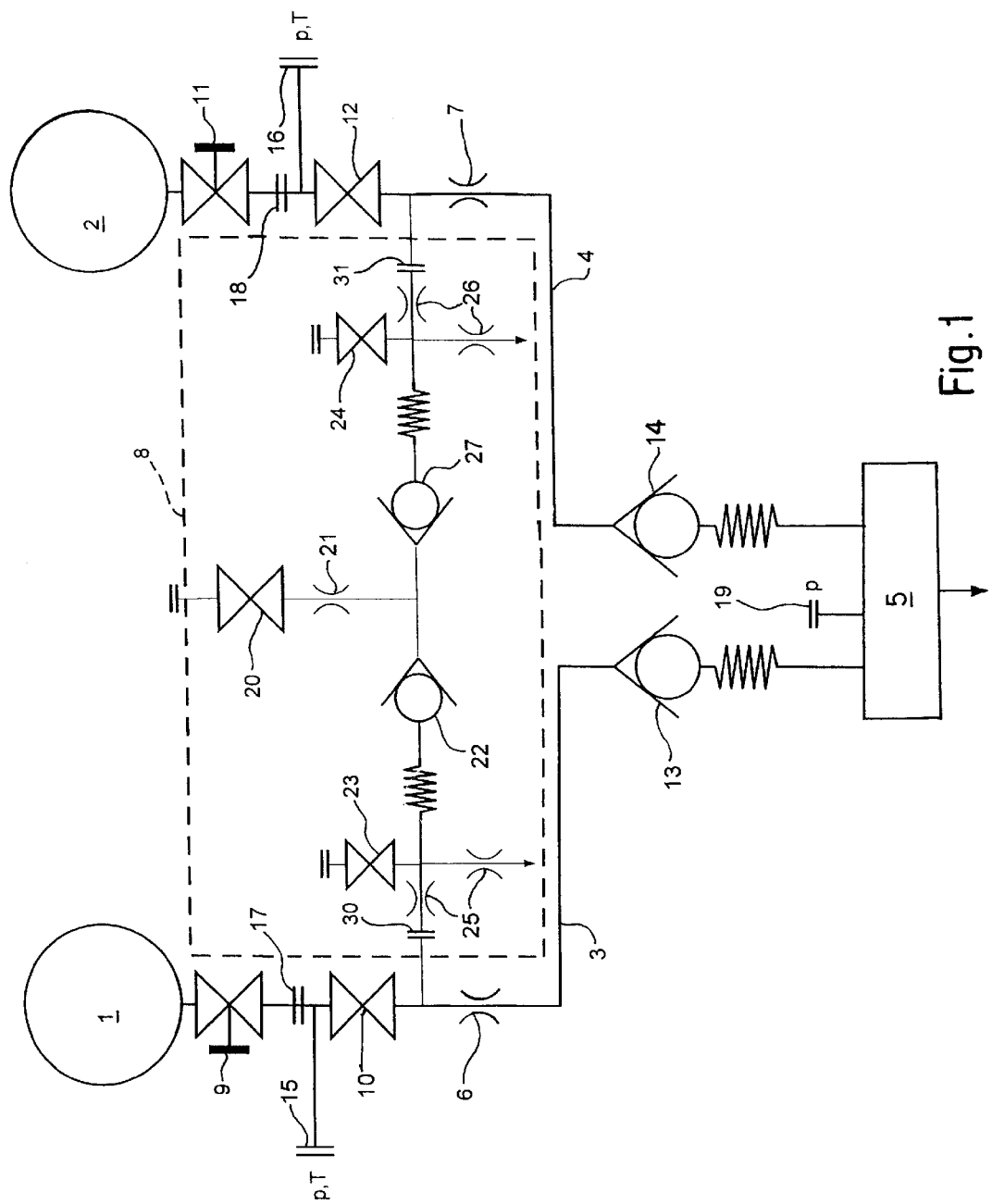
FIG. 1 is a schematic representation of a high-pressure blowdown ignition system.

The ignition system illustrated in FIG. 1 is constructed, for example, as a high-pressure blowdown ignition system; that is, the delivery of the operating media or fuels of the ignition system takes place by virtue of a pressure gradient between the storage tanks 1, 2 and the outlet openings of the igniter 5. The latter can, for example, be constructed as an electric igniter. The ignition system can be used, for example, for the ignition of rocket combustion chambers but can also be used in other combustion chambers.

In this ignition system, two storage tanks 1, 2 are provided as fuel tanks; one tank 1, as the container for a fuel to be burned (for example, $H_2$) as the first fuel constituent, and a second tank 2, as the container of an oxidant (for example, $O_2$) as the second fuel constituent, which supplies the oxygen required for the combustion. Each of the tanks 1, 2 is provided with a shut-off valve 9, 11 and has a flange 17, 18 by means of which it can be coupled to the ignition system. Each tank 1, 2 can therefore be exchangeably removed from the ignition system and can therefore be filled externally under optimized conditions, and stored separately from the ignition system until shortly before the actual ignition or to shortly before the end of the preparations for the start of the carrier system with which the ignition system is interacting. Therefore, the ignition system also becomes more flexible because, as a result of a simple exchange of the tanks 1, 2, the ignition system can be rapidly adapted to the individual situations of a special use of the ignition system.

The tanks 1, 2 are connected with the igniter 5 by way of the feed pipes 3, 4. Shut-off valves 10, 12 are inserted into these feed pipes; here, particularly electric shut-off valves which can take up the opened and closed conditions. Special pressure control for the valves is not required because pressure is regulated in the feed pipes 3, 4 by means of passive elements, specifically by restrictors 6, 7. The pressure on the igniter side is adjusted in a simple manner by the shaping and dimensioning of the passage openings of the restrictors 6, 7.

In order to prevent penetration of undesirable substances (particularly moisture) into the feed pipes 3, 4 and the tanks 1, 2, the feed pipes 3, 4 are provided with non-return valves 13, 14. For monitoring the operation of the ignition system and the function of the valves, measuring devices 15, 16 are provided which are connected with the feed pipes 3, 4 and there determine the temperature and the pressure in the feed pipes 3, 4. Additional measuring devices 19 of this type can also be provided, for example, in order to determine the pressure in the igniter 5.

Finally, a rinsing and ventilating system 8 is provided which is connected with the feed pipes 3, 4 and is used for
- freeing the ignition system of residues of the fuel constituents;
- rinsing the ignition system with a cleaning gas, such as helium, in order to also remove rests of the fuel constituents or, for example, moisture and thus prevent the formation of ice in the ignition system;
- ensuring the carrying-away of the fuel constituents in the event of an abortion of the ignition.

According to FIG. 1, the rinsing and ventilating system 8 has for this purpose, for example: a valve 20, for example electromagnetically controlled, in order to permit the inflow and outflow of the cleaning gas (He); a restrictor 21 in order to adjust the pressure for the inflow of the cleaning gas; non-return valves 22, 27 in order to prevent a penetration of the fuel constituents into the rinsing and ventilating system 8; shut-off valves 23, 24, for example, electromagnetically or pyrotechnically operated, in order to permit a carrying-away of the fuel constituents from the feed pipes 3, 4; additional stop plugs 25, 26 to adjust in a defined manner the pressure in the drains for the fuel constituents and thus the discharge of these constituents. The rinsing and ventilating system is constructed as a constructional unit which can be connected by way of flanges 30, 31 with the feed pipes 3, 4.

Figure 2:
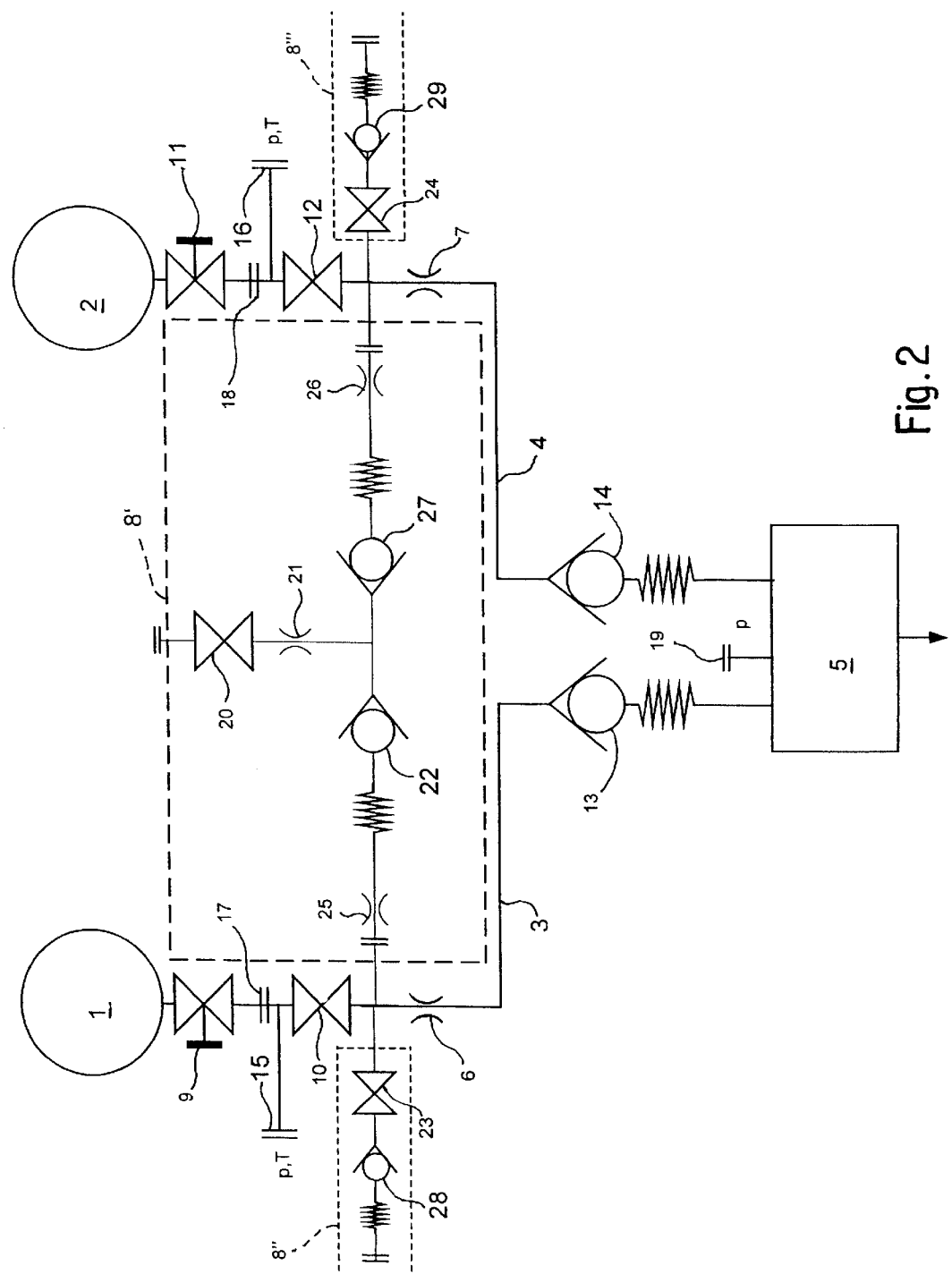
FIG. 2 is a view of the ignition system according to FIG. 1 with an alternative design of the rinsing and ventilating system.

FIG. 2 shows an alternative embodiment of the rinsing and ventilating system 8 which in this case consists of a rinsing part 8' as a constructional unit analogous to the arrangement of FIG. 1 as well as of ventilation parts 8" and 8'" separately linked to the feed pipes 3, 4. The ventilation parts 8" and 8'", in turn, have shut-off valves 23, 24 which are now followed by non-return valves 28, 29 in order to prevent a penetration of undesirable substances into the feed pipes 3, 4.

In order to permit multiple ignitions of the ignition system by which repeated consecutive ignition of combustion chambers can be achieved, the control of the valves 10, 12, 13, 14 as well as the valves 10, 12, 13, 14 themselves are designed such that a repeated release and blocking of the flow of the fuel constituents is possible. As required, the other devices of the ignition system, such as the igniter, can also be adapted to such a multiple ignition operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An ignition system for a combustion chamber of a rocket engine comprising:
   a first fuel tank for a first fuel constituent;
   a second fuel tank for a second fuel constituent, both the first and second fuel tanks being separated from fuel tanks of the rocket engine;
   an igniter; and
   separate feed pipes for the respective fuel constituent, each of said feed pipes being arranged between the igniter and one of the fuel tanks;

wherein the first and second fuel tanks are detachably coupled to the respective feed pipes.

2. The ignition system according to claim 1, further comprising control and regulating units for the flow of the fuel constituents, which control and regulating units are operable repeatedly for multiple consecutive ignitions.

3. The ignition system according to claim 1, further comprising at least one restrictor arranged in each feed pipe for regulating pressure.

4. The ignition system according to claim 1, further comprising at least one shut-off valve arranged in each feed pipe.

5. The ignition system according to claim 1, wherein each feed pipe is connected with a rinsing and ventilating system.

6. The ignition system according to claim 1, wherein each of the feed pipes has at least one non-return valve.

7. The ignition system according to claim 1, wherein the feed pipes are connected with devices for determining at least one of pressure and temperature in the feed pipes, for monitoring quantities indicative of operation of the ignition system.

8. The ignition system according to claim 1, wherein the igniter is connected with devices for determining at least one of pressure and temperature in the igniter, for monitoring quantities indicative of operation of the ignition system.

9. The ignition system according to claim 1, wherein said first and second fuel tanks are coupled to the respective feed pipes by detachable mounting flanges.

10. The ignition system according to claim 5, wherein the rinsing and ventilating system includes a valve coupled to supply an inflow of a cleaning gas into said feed pipes.

11. The ignition system according to claim 10, wherein said rinsing and ventilation system further comprises an alternate flow path for diverting fuel constituents in said feed pipes, and a valve which is operable to open and close said alternate flow path.

* * * * *